Feb. 16, 1943.  J. T. SMITH ET AL  2,311,000
ICE CREAM HARDENING AND DISPENSING CABINET
Filed July 10, 1940.  5 Sheets-Sheet 1

Inventors.
James T. Smith
Alexander L. Reiter
By Carl R. Floyd Attorney.

Feb. 16, 1943. J. T. SMITH ET AL 2,311,000
ICE CREAM HARDENING AND DISPENSING CABINET
Filed July 10, 1940 5 Sheets-Sheet 2
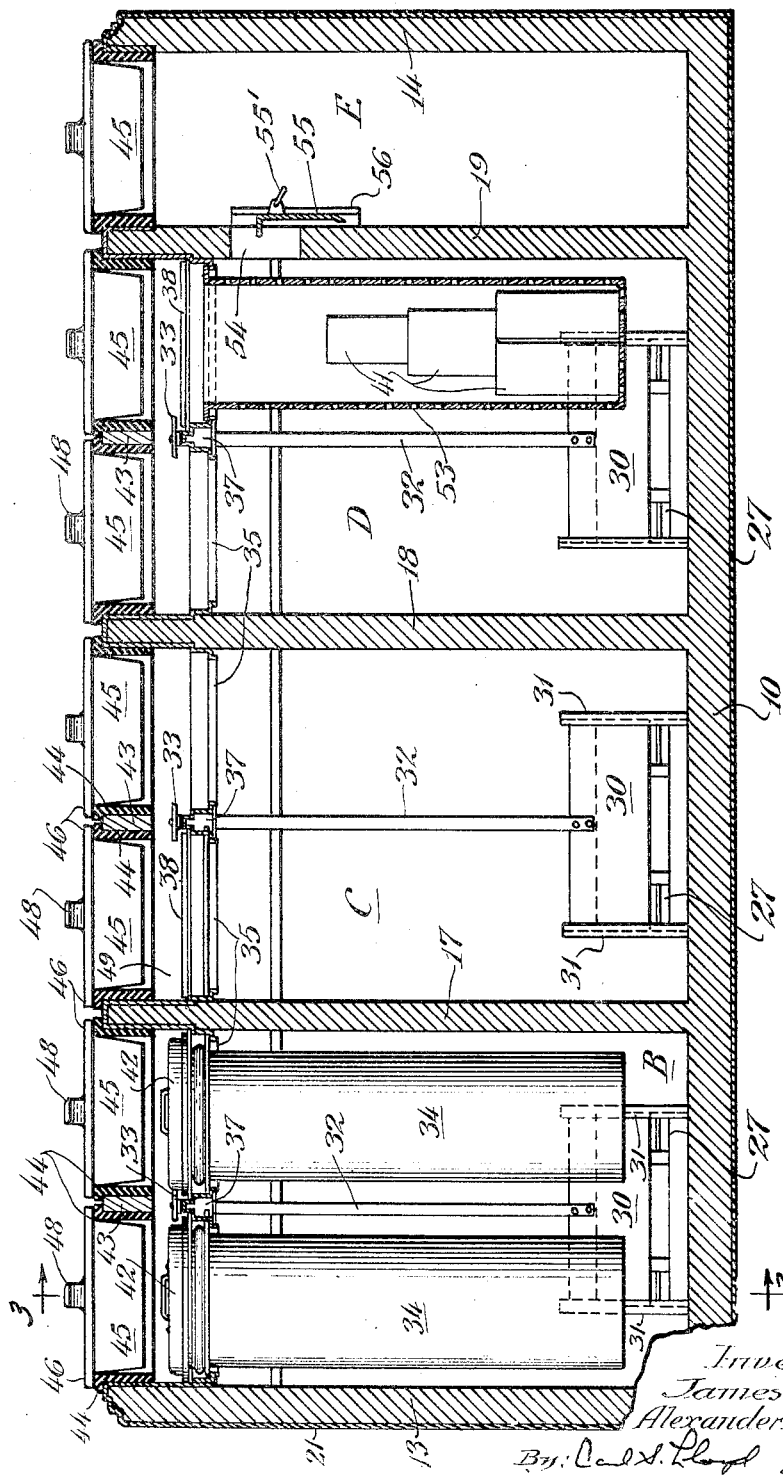

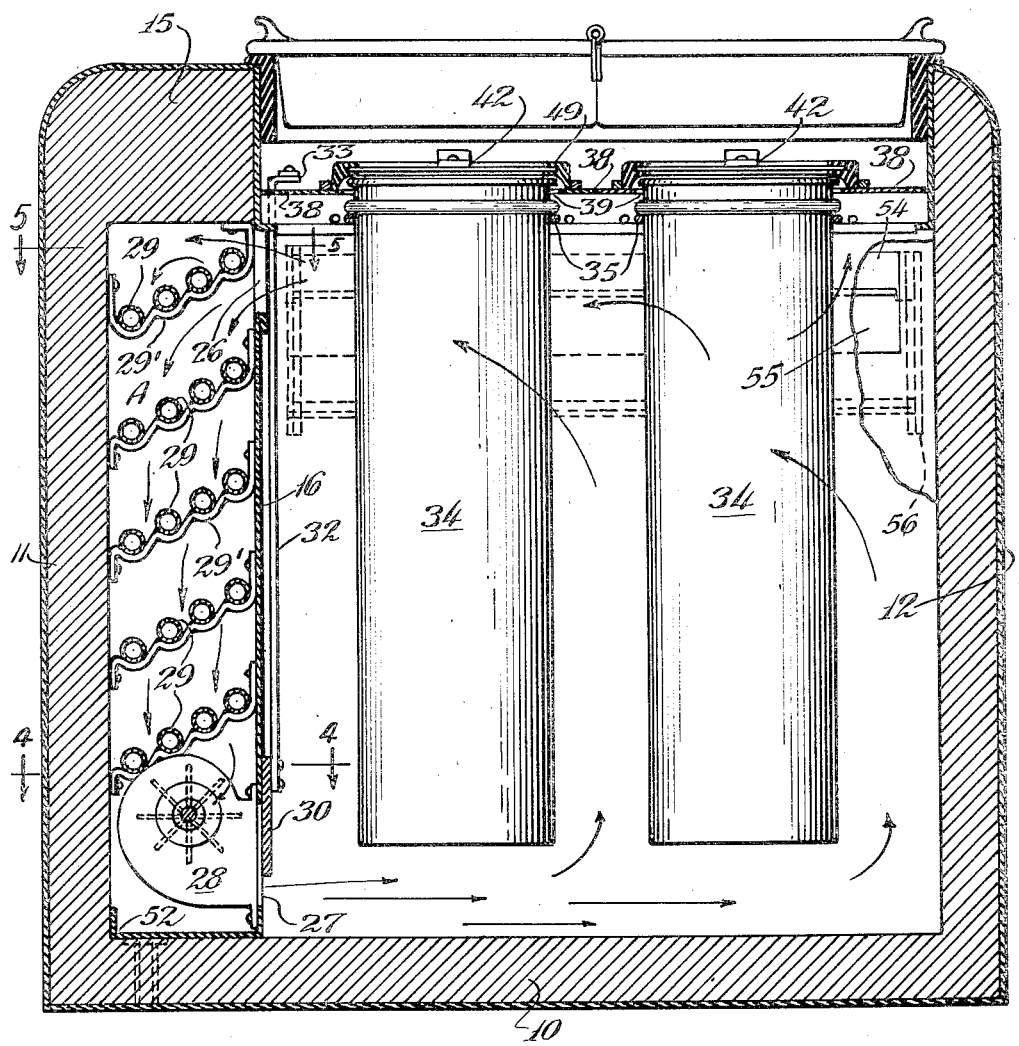

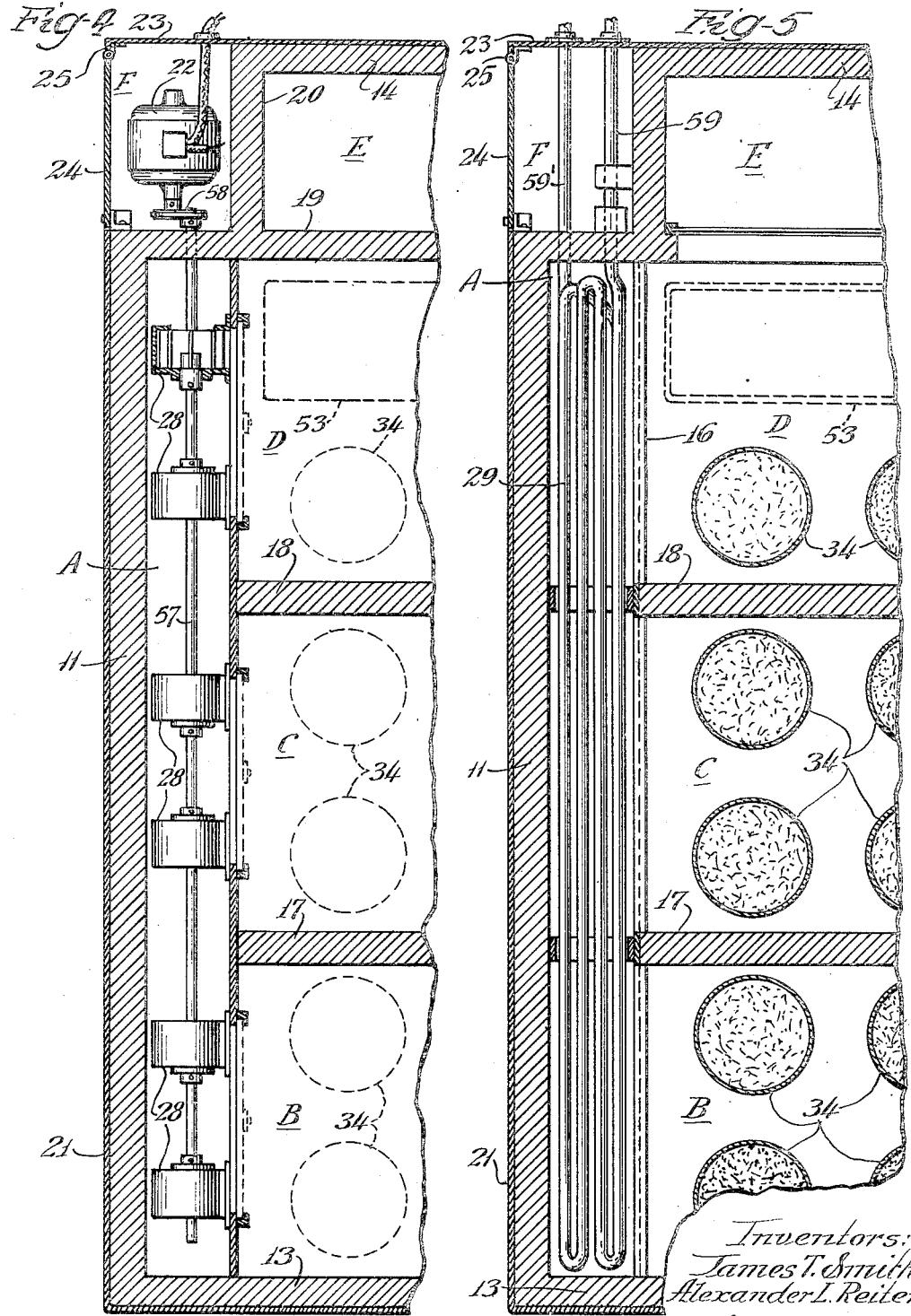

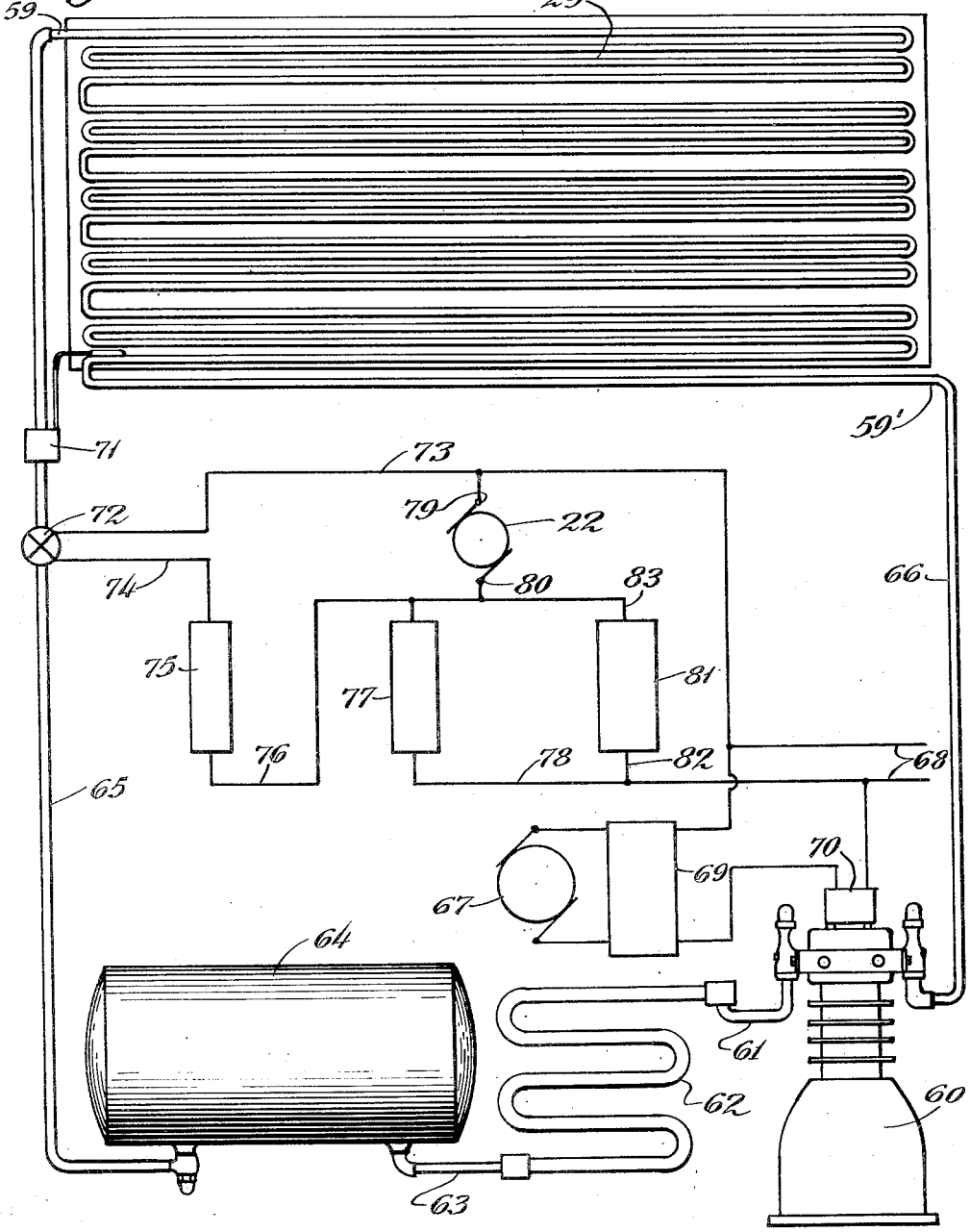

Patented Feb. 16, 1943

2,311,000

UNITED STATES PATENT OFFICE 2,311,000

ICE CREAM HARDENING AND DISPENSING CABINET

James T. Smith and Alexander L. Reiter, Chicago, Ill., assignors to Mills Novelty Company, Chicago, Ill., a corporation of Illinois Application July 10, 1940, Serial No. 344,624

20 Claims. (Cl. 62—102).

This invention relates to apparatus for hardening ice cream and conditioning it for dispensing in stores and other places where ice cream or the like is sold, particularly in places where counter freezers are employed.

Prior to the present invention it was customary for the users of counter ice-cream freezers to have separate cabinets for hardening and for dispensing the ice cream produced by the freezer, because of the difference in temperature and refrigerating capacity required for hardening the ice cream and for mellowing it to the proper consistency for dispensing.

An object of the invention is to provide a single refrigerating cabinet adapted to both harden the ice cream and maintain it at a temperature suitable for dispensing.

Another object of the invention is to provide such a cabinet which is adapted also to maintain at suitable temperature a batch of ice-cream mix in an unfrozen state.

Another object is to provide a refrigerator having two or more compartments, each maintainable, if desired, at a temperature different from the temperature of the other compartments.

A further object is to provide an apparatus of the character described which is capable of simultaneously maintaining temperatures in different compartments ranging from as low as 35 degrees below zero Fahrenheit up to 33 degrees above zero, i. e., from a rapid hardening temperature to a temperature at which it is suitable to maintain ice-cream mix, unfrozen, preparatory to freezing.

Another object of the invention is to provide such an apparatus in which the temperature of any of the compartments may be varied with respect to that of the other compartments without varying the operation of the refrigerating unit. This is accomplished by employing forced convection for transferring the heat from the ice-cream compartments to the coils of the refrigerating unit and varying the amount of circulation in the individual compartments so as to control the temperature thereof.

A further object is to provide for such a temperature range from the operation of but a single heat exchange element.

Another object of the invention is to provide an arrangement in which maximum efficiency of circulation of air to both near and remote rows of containers in a compartment is secured.

Ice cream, as it comes from the freezer, usually has a temperature of about 20 to 25 degrees Fahrenheit. In order to properly prepare it for consumption, it is first hardened by subjecting it to an extremely low temperature until it is hard all the way through. It must then be mellowed or allowed to rise again to a higher temperature before it is in suitable condition to be dispensed. Other methods have required at least sixteen hours for proper hardening, and a further substantial period for tempering. The present invention makes possible a very material reduction in the total time required to effect proper hardening and tempering.

Another and important object of the invention is to provide a refrigerating cabinet in which the ice cream, in the usual five-gallon cans, may be first hardened and then tempered, so as to be ready for dispensing, without the necessity of any attention being given to the equipment by the operator after the ice cream has once been placed therein. To this end, a combination time and thermostatic control is provided, the construction and operation of which will be hereinafter described.

Other objects and advantages of the invention will become apparent from the following detailed description, which, taken in connection with the accompanying drawings, discloses a preferred embodiment thereof.

On the drawings:

Fig. 2 is a longitudinal, vertical, sectional view of the same taken substantially on the section line 2—2 of Fig. 1;

Fig. 3 is a transverse sectional view of the same, taken substantially on the line 3—3 of Fig. 2, with portions of the partition walls broken away for convenience in illustration;

Fig. 4 is a partial horizontal section of the cabinet taken substantially on the section line 4—4 of Fig. 3;

Fig. 5 is a similar section taken substantially on the line 5—5 of Fig. 3; and

Fig. 6 is a schematic view of the refrigeration system used for refrigerating the cabinet.

Figure 1:
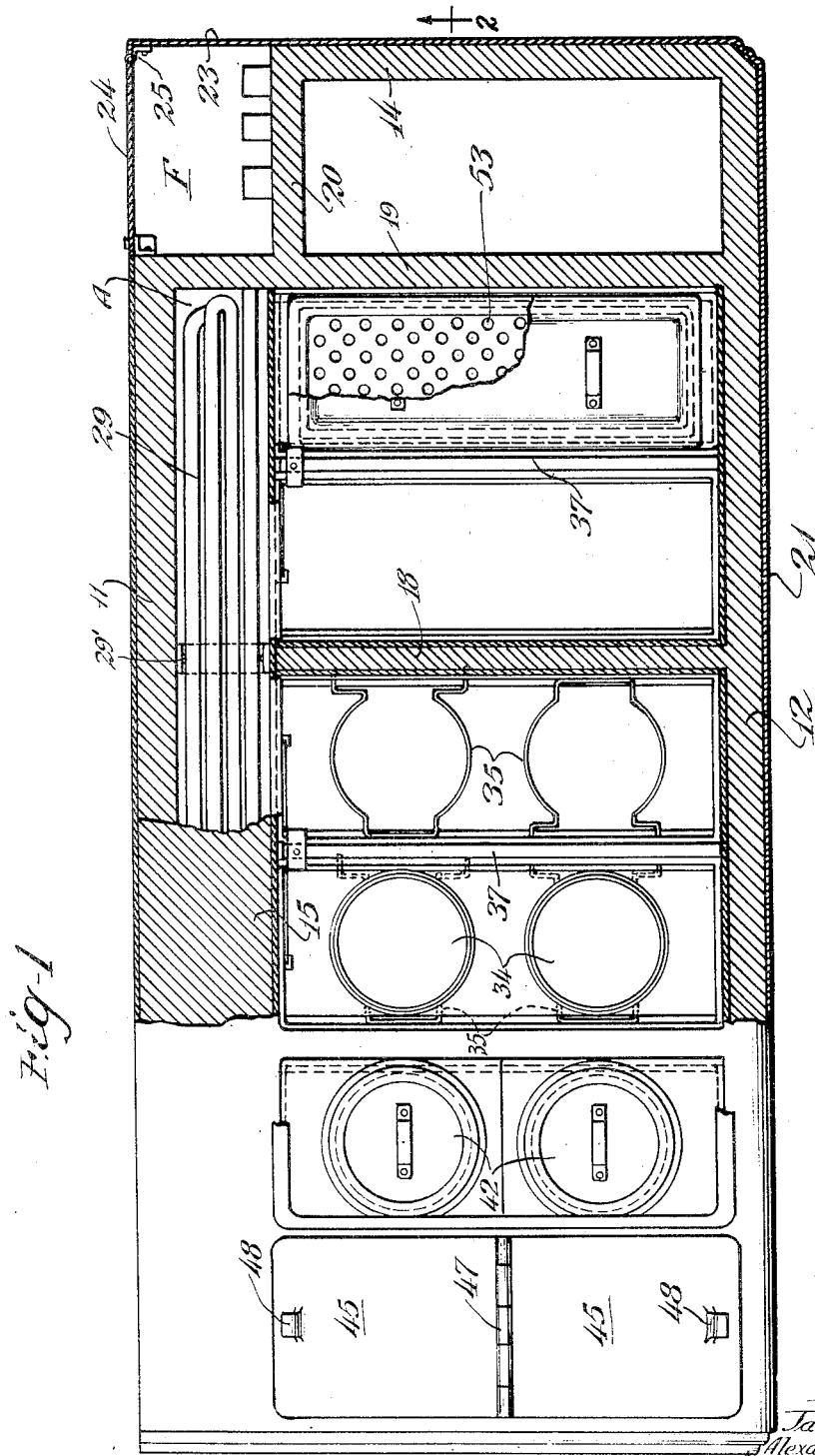
Fig. 1 is a plan view, partly in section, of a refrigerating cabinet embodying the invention.

The cabinet shown in said drawings has a bottom wall 10, side walls 11 and 12, and end walls 13 and 14. The top is open except for a top wall section 15 (Fig. 3) above a refrigerating space A, which is defined between the side wall 11 and a longitudinal partition 16 extending the greater part of the length of the cabinet.

The space between the longitudinal partition 16 and the other side wall 12 is divided by the transverse partitions 17, 18 and 19, into the compartments B, C and D, respectively. Between the partition 19 and the end wall 14 there is formed a mix compartment E. The partition 16 extends from the end wall 13 to the partition 19, the latter extending the full distance between the side walls 11 and 12. The end of the mix compartment E opposite the wall 12 is formed by a partition 20, located inwardly from the plane of the wall 11.

The exterior walls 10, 11, 12, 13, 14 and 15, and the partitions 17, 18, 19 and 20 are all formed of insulating material, the exterior surfaces being sheathed in metal sheeting 21 in a conventional manner. The wall 16 may be of sheet metal.

It will now be noted that the compartment A extends the full length of the three compartments B, C and D, but terminates short of the mix compartment E. This leaves a space in the corner of the cabinet adjacent the wall 20 of the mix compartment E, which is utilized to form a small compartment F for housing a blower motor 22. The exterior walls of the compartment F are formed by an extension 23 of the sheathing sheet 21 on the end wall 14, and a door 24 hinged at 25 to said extension 23.

As best shown in Fig. 3, the longitudinal partition 16 terminates short of the top wall 15 to form a series of ports 26, establishing communication between the upper regions of the compartments B, C and D, respectively, and the refrigerating space A. In the lower region of said wall 16 there are openings 27 through which blowers 28, located in the lower part of the compartment A, may direct refrigerated air into the respective compartments B, C and D.

A heat exchange element 29 of coiled tubing extends from one end of the refrigerating space A to the other, and from the top of the space A to a point just above the blowers 28. Said tubing, as shown, is supported by brackets 29' extending transversely in the space A, and attached to the partition 16 and wall 11. The arrangement is such that any set of blowers 28 (there being two blowers for each of the compartments B, C and D) may draw air not only from the adjacent portion of the heat exchange element 29, but from other regions thereof as well. The advantage of this arrangement will hereinafter appear.

The blower discharge openings 27 may be closed by vertically slidable gates 30, which are slidably mounted in slideways 31 attached to the exterior of the wall 16. Each gate 30 is provided with an operating bar 32 which extends upwardly and has at its upper end a handle 33 by means of which the operator may raise or lower the gate so as to vary the size of the associated opening 27. The amount of air circulation in a given compartment will be proportional to the size of its opening 27, since the discharge mouths of the blowers 28 are attached to the wall 16 in registry with the openings 27. Consequently, the full refrigerating effect of the heat exchange element may be concentrated, if desired, in one compartment by closing off the circulation in the other two compartments. Furthermore, if the arrangement shown is employed, each blower may draw air passing over a greater area of the heat exchange element than that opposite the compartment served by the particular blower, the extent of such area being roughly proportional to the size of the opening 27 of such compartment.

When it is desired to simultaneously employ one compartment for hardening and another for maintaining ice cream at suitable temperatures for dispensing, the gate 30 in the compartment to be employed for hardening may be opened fully and the gate in the other compartment may be closed or nearly closed so as to allow little or no forced circulation of air in the latter compartment. This will result in a much lower temperature in the first compartment, owing to the fact that the compartments are insulated from each other and the one which receives the greatest amount of air circulation will be maintained at the lower temperature.

Each of the compartments B, C and D is adapted to receive four ice-cream containers 34, which ordinarily are cans of five gallon capacity. As shown, the containers are supported by brackets 35 extending between an adjacent wall or partition and a bridge bar 37, one of which extends medially of each of the compartments B, C and D, transversely of the cabinet.

The height of the brackets 35 may be such that the containers 34 will be supported with their lower ends substantially spaced from the bottom 10 of the cabinet. The blowers 28, being positioned in the lower region of the compartment A so as to discharge along the bottom of the various compartments, will then direct the refrigerated air beneath the pair of containers 34 closest thereto so that the others will receive substantially as much of the circulated air as will said closest pair. The course of the circulation is indicated by the arrows in Fig. 3.

As the air moves upwardly around the containers 34, it will be deflected by a horizontal plate 38 in the top of the compartment and directed through the ports 26 back into the refrigerating unit space A. The plate 38 has openings 39 therein through which the containers may be inserted, being thus a can collar member, and if any container 34 is not in place, a loose can cover 42 may be laid over the opening so that in the event the compartment should be opened during operation of the refrigerating mechanism, cold air will not be blown out of the cabinet. Said covers 42 rest on the plate 38 and are used to cover the cans 34 when they are in place.

Sill members 43 extend transversely of the compartments directly above the bridge bars 37, and they, as well as the upper extremities of the walls and partitions defining the compartments B, C and D, are lined with conventional rubber facing 44. Said sill members 43 divide the top of the compartments B, C and D into two openings which are closed by insulated covers 45 having flanges 46 resting upon the facing members 44. Each of the covers 45 is preferably formed in two sections, hinged together as at 47, and each having a hand-hold 48 at the outer edge thereof. The compartment E is similarly closed by a single cover 45.

A space 49 (Fig. 3) is formed between the covers 45 and the top plate 38 of the compartments B, C and D to provide a space in which access may be had to the containers 34 while the refrigerating mechanism is in operation without allowing any substantial amount of the refrigerated air to escape from the compartment, and without allowing any substantial amount of warm air from the exterior of the cabinet to enter the air circulating space. A certain amount of outside air, however, will constantly replace the air which is being circulated, owing to leakage through cracks and openings, and there will also be frequent interchange of exterior air with the circulated air due to opening and closing of the mix compartment E. It will therefore become necessary to defrost the heat exchange element 29 at intervals so as to remove the frost deposited by condensation of the moisture carried by such exterior air.

Defrosting is accomplished in a simple manner by removing the containers 34, which contain the ice cream, and also the plates 38 (which are removably mounted) and the cover members 42 and 45, and allowing the blowers 28 to operate while the compressor of the refrigerating system is shut off, so as to circulate warm air from the exterior of the cabinet through the compartment A and melt off the frost. The water thus formed is collected in a trough 52 in the bottom of the compartment A, said trough being provided with a suitable drain outlet.

One of the compartments B, C or D may be equipped with a foraminous basket 53, as shown in Fig. 2, for the purpose of receiving packages 41 of ice cream.

For proper hardening, the temperature should be in the neighborhood of 23 degrees below zero Fahrenheit or lower. For dispensing, the temperature should be in the neighborhood of 5 degrees above zero. As before stated, both of these temperatures may be maintained simultaneously in different compartments of the same cabinet.

The temperature of the ice-cream mix, in unfrozen state, ready for freezing, should be in the neighborhood of 33 degrees above zero. To secure this temperature the compartment E is separated from the compartments D by the insulated wall 19 as above described, and a relatively narrow opening 54 is provided in the wall 19 extending substantially the full width of the compartment E. A sheet metal gate 55, slidably mounted in channeled slideways 56 and having a handle 55' thereon, is provided to close the opening 54 either completely or partially. When closed, it serves as a medium for transferring a certain amount of heat from the compartment E to the compartment D. Refrigeration in the compartment E may be increased by opening the gate 55 so as to allow air from the compartment D to enter the compartment E. Circulation will be set up in the compartment E by natural convection when the gate 55 is open, the colder, heavier air from the compartment D flowing into said compartment through the lower portion of the opening and the warmer air from the compartment E flowing into the compartment D through the upper portion of the opening. Considerable variation in temperature may be obtained by varying the size of the opening 54 by means of the gate 55.

The blowers 28 are all operated from a common shaft 57 (see Fig. 4), one end of said shaft extending through the wall 19 and being geared to the motor 22 by a chain and sprocket or belt drive 58. Ends 59 and 59' of the tubing forming the heat exchange element 29 may also be extended through the wall 19 into the compartment F and through the outer wall 23 thereof, as shown in Fig. 5, said ends being connected to the fluid circulation system, which will now be described.

Referring to Fig. 6, the automatic refrigerating system of the invention comprises a conventional compressor-condenser unit including a compressor 60, a tube 61 leading from the high side of the compressor to a condenser 62, a tube 63 for conveying the condensed, liquefied refrigerant to a receiver 64, a tube 65 for conveying the refrigerant from the receiver 64 to the pipe 59 of the heat exchange coil 29, a tube 66 for conveying the vaporized refrigerant from the heat exchange coil 29 back to the low side of the compressor 60, and a motor 67 for operating the compressor-condenser unit. From a source of electrical energy 68, current is supplied to the motor 67 through a starter box 69 and a pressure-controlled switch 70, adapted to cut out the motor when the pressure in the high side of the system exceeds a predetermined maximum.

As hereinbefore stated, an important object of the invention is to provide an arrangement wherein the refrigerator will first harden a batch of ice cream, then temper it to a temperature at which it is in condition for dispensing, and then maintain it at such temperature for an indefinite period of time. This is accomplished automatically by the provision of a time switch which controls the operation of the refrigerator for a predetermined period of time sufficient for hardening and then cuts out, after which a thermostatic switch takes over the control and causes the refrigerating system to again commence operation when the temperature rises above that at which the ice cream is in proper condition for dispensing and to operate intermittently thereafter as may be required to maintain said temperature. To this end we provide in the high-side pipe line 65, in addition to the usual expansion valve, which is indicated at 71, a solenoid valve 72 adapted to be energized by current supplied from the line wires 68 through a conductor 73 connecting one side of said valve 72 to one of the wires 68, a conductor 74 connected to the other side of said valve 72, a manually operable switch 75 in the conductor 74, a conductor 76 connected to the other side of said switch 75, a thermostatic switch 77 in the conductor 76, and a conductor 78 connecting the other side of said thermostatic switch 77 to the other line wire 68. The thermostat 77 is set to cut in at a temperature in the neighborhood of 5 degrees above zero. Therefore, when the thermostat 77 is in control, the temperature of the heat exchange element will be maintained at approximately this level, the thermostat 77 being suitably located in one of the hardening compartments, as the compartment D, so as to be responsive to the temperature therein. As long as the valve 72 remains open to allow circulation of refrigerant through the coil 29, the blower motor 22, which is connected in parallel with the valve 72 by means of wires 79 and 80, connected to the wires 73 and 76, respectively, will also be in operation. The compressor-condenser unit will also operate while the valve 72 is open as a result of the control of the pressure-operated switch 70, which opens when the pressure builds up in the compressor-condenser unit after closing of said valve 72.

The refrigerating unit is caused to operate at a temperature much lower than that controlled by the thermostat 77, by means of a time-controlled switch 81 shunted across the thermostat 77 by wires 82 and 83 connecting said time switch to the wires 78 and 80, respectively. Being unaffected by temperature, the switch 81 causes the refrigerating unit to operate continuously during the period for which it is set. This period may be, say, eight hours in length. Assuming it to be so, and assuming that it takes an additional four or five hours for the temperature of the interior of the cabinet to rise from the hardening to the dispensing level, the operator may set the mechanism so that the time switch will close at, say, 9:00 p.m., whereupon the mechanism will operate during the remainder of the night on the hardening cycle, and sufficient time will remain after the time switch opens at, say, 5:00 a.m. the next morning, for the tempering process to be completed prior to the beginning of the day's business.

It will be understood that when the time switch opens, the refrigerating unit will shut down and will remain inoperative until the tempering period has passed, i. e., until the temperature has risen to the dispensing level, whereupon the thermostatic switch 77 will assume control. This switching from the hardening to the dispensing cycle of operation is completely automatic, so as to require no attention on the part of the operator.

If desired, all three of the compartments B, C and D may be filled with ice cream to be hardened and operated at hardening temperature during the night and at dispensing temperature during the day. If only part of the space in the cabinet is required for hardening, and there is cream to be held over for the next day's use, the compartment containing such cream may be maintained at dispensing temperature while hardening takes place in the other compartments. If deemed desirable, as for example, in an establishment operating both day and night, the time switch may be set so that the refrigerating unit will operate continuously, or substantially so, both day and night, and the changes from the hardening to the dispensing cycle may be accomplished by manipulation of the gates 30.

For defrosting, the manual switch 75 may be opened and the time switch 81 closed, whereby a circuit will be established through the blower motor 22 from one of the wires 68 through the wires 82, 83, 80 and 79 to the other wire 68. Thus the blower will be caused to operate while the heat exchange unit 29 is inoperative.

As previously indicated, one advantage of the invention is that the refrigerating unit may be allowed to operate constantly during the hardening period. Under such constant operation, the temperature may drop to as low as 30 to 35 degrees below zero, although the necessary temperature for proper hardening is only about 23 degrees below zero. At the lower temperature, hardening is effected more rapidly than would otherwise be possible.

An advantage of having the blowers 28 located at the bottom of the refrigerating space A is in protecting them against moisture and frost. During normal operation, moisture will be taken out of the air by the coil 29 before it reaches the blowers. Only during defrosting will the blowers be subjected to the attack of moisture, and this of course will be for only a relatively short time.

A further advantage of the invention is that it provides a cabinet having minimum overall length in relation to its capacity. This is accomplished by locating the refrigerating space along one side of the cabinet and allowing the refrigerating compartments to occupy substantially the full length of the cabinet. Such location of the refrigerating space also makes it possible to maintain uniform refrigeration, if desired, in all of the compartments (with the exception of the mix compartment), or, to maintain widely differing temperatures in the different compartments if this be required by the conditions of use of the cabinet. It is possible to maintain with this arrangement a highly flexible control over the temperatures in the various compartments.

The foregoing detailed description has been given for clearness of understanding only, and no unnecessary limitations should be understood therefrom, but the appended claims should be construed as broadly as permissible in view of the prior art.

What we regard as new and desire to secure by Letters Patent is:

1. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, and means for creating forced circulation of air between said single refrigerating compartment and any or all of said ice-cream compartments.

2. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, means for creating forced circulation of air between said single refrigerating compartment and any or all of said ice-cream compartments, and gates for the inlet openings from the refrigerating compartment to the ice-cream compartment whereby any one of said openings may be closed completely or to such extent as may be desired.

3. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, and means for creating forced circulation of air between said single refrigerating compartment and any or all of said ice-cream compartments, said last-mentioned means comprising blowers of which there is at least one adjacent the inlet opening of each compartment.

4. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, and means for creating forced circulation of air between said single refrigerating compartment and any or all of said ice-cream compartments, said last-mentioned means comprising blowers of which there is at least one adjacent the inlet opening of each compartment, a common shaft for operating said blowers, and means for driving said shaft.

5. In a refrigerator for conditioning ice cream and the like, an elongated cabinet transversely partitioned to form a plurality of compartments, a refrigerating space in one side of the cabinet extending substantially the full length of said compartments, a heat exchange element in said space extending substantially the full length thereof, inlet and exhaust ports providing direct and independent communication between each of said compartments and said refrigerating space, means for closing the individual inlet ports or varying the area thereof so as to control the amount of air that may circulate in a given compartment, and means for causing the air to circulate in those compartments the inlet ports of which are open.

6. In a refrigerator for conditioning ice cream and the like, a cabinet having a hardening compartment and a refrigerating space disposed alongside said hardening compartment, a vertical wall separating said space from said compartment, intake and exhaust ports in the lower and upper regions of said wall, respectively, means for creating a forced circulation of refrigerated air from said refrigerating space through said intake port into said hardening compartment and then through said exhaust port back into said refrigerating space, and means for controlling the volume of said circulation, said last-mentioned means comprising a gate slidably mounted adjacent said discharge port for opening or closing the same to a desired degree, and means accessible to an attendant at a point outside the refrigerated space of the hardening compartment for adjusting the position of said gate.

7. In a refrigerator for conditioning ice cream or the like, an elongated cabinet transversely partitioned to form a plurality of compartments, a refrigerating space in one side of the cabinet extending substantially the full length of said compartments, a heat exchange element in said space extending substantially the full length thereof, inlet and exhaust ports providing communication between each of said compartments and said refrigerating space, means for closing the individual inlet ports or varying the area thereof so as to control the amount of air that may circulate in a given compartment, and means for causing the air to circulate in those compartments the inlet ports of which are open, the arrangement in the refrigerating compartment being such that the air delivered to any given compartment may be drawn over an area of said heat exchange element roughly proportional in surface area to the size of the inlet opening for said compartment.

8. A combined hardening and dispensing refrigerator for ice cream, comprising a cabinet transversely partitioned to form a plurality of compartments, a refrigerating space in one side of the cabinet extending substantially the length of the space occupied by said compartments, a heat exchange element extending substantially from end to end of said space, intake and exhaust ports connecting each of the compartments with said refrigerating space, blower means for each of the compartments for circulating air from the refrigerating space into the compartment and then back into the refrigerating space, and means for varying the amount of air circulated by the blowers to their respective compartments, the arrangement within the refrigerating space being such that the blower means for any given compartment may draw air from areas of the heat exchange element roughly proportionate in size to the amount of air being delivered to that compartment as compared to the amounts being delivered to other compartments.

9. A refrigerator for conditioning ice cream and the like, comprising a cabinet having a compartment for receiving ice-cream containers, a refrigerating space at one side of said compartment, means for supporting the containers in said compartment with their bottoms spaced above the bottom of the cabinet to form an unobstructed air circulating space in which the refrigerated air may directly contact the containers, a heat exchange element in said refrigerating space, and a blower located below said heat exchange element and having a discharge mouth communicating with said compartment and positioned to discharge into said air circulating space beneath the bottoms of the containers.

10. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, means for creating forced circulation of air between said single refrigerating compartment and any or all of said ice-cream compartments, a mix cooling compartment adjacent one of said ice-cream compartments and isolated from said refrigerating compartment, and means for causing cooling of said mix compartment from said ice-cream compartment to a controlled degree.

11. A refrigerator for conditioning ice cream and the like, comprising a cabinet having a plurality of compartments for the ice cream, a refrigerating compartment in said cabinet extending lengthwise thereof alongside the several ice-cream compartments, a heat exchange element in said refrigerating compartment of such length that portions thereof are disposed opposite each ice-cream compartment, openings providing communication between said refrigerating compartment and each ice-cream compartment, means for creating forced circulation of air between said single refrigerating compartment and any or all of said ice-cream compartments, a mix cooling compartment adjacent one of said ice-cream compartments, and means for causing cooling of said mix compartment from said ice-cream compartment to a controlled degree, said last-mentioned means comprising an opening in the wall between said mix compartment and said ice-cream compartment and a gate for closing said opening or varying the size thereof.

12. In a combined ice-cream hardening cabinet and ice-cream mix cooler, a cabinet having a hardening compartment and a refrigerating space disposed at one side of said hardening compartment, means for creating a circulation of refrigerated air from said refrigerating space through said hardening compartment, and a mix compartment disposed adjacent said hardening compartment and separated from said refrigerating space, a wall of insulating material separating said mix compartment from said hardening compartment, said wall having in the upper region thereof an opening providing communication between said compartments, and a gate of heat conductive material movably mounted adjacent said opening, adapted when in closed position to effect heat transfer between said compartments at a minimum rate of transfer, and when in open position to allow air from the hardening compartment to circulate through said mix compartment to effect heat transfer at a more rapid rate.

13. In a combined hardening and dispensing cabinet for conditioning ice cream and the like, a compartment adapted to receive a container of ice cream, electrically operated refrigerating means for creating a forced circulation of refrigerated air through said compartment and around said container, said means including a heat exchange element and a motor-operated blower, and means including a time switch and a thermostatic switch arranged to successively control the operation of said refrigerating means, so as to cause the same to maintain in said compartment an extremely low temperature for a period sufficient to effect hardening of the ice cream in said container, then to allow the temperature in said compartment to gradually rise to a dispensing temperature and thereafter to maintain said dispensing temperature in said compartment, all automatically without attention on the part of the operator.

14. In a combined hardening and dispensing cabinet for conditioning ice cream and the like, a compartment adapted to receive a container of ice cream, refrigerating means for creating a forced circulation of refrigerated air through said compartment and around said container, said means including a heat exchange element and a motor-operated blower, and means for controlling the operation of said refrigerating means, so as to cause the same to maintain in said compartment an extremely low temperature for a period sufficient to effect hardening of the ice cream in said container, then to allow the temperature in said compartment to gradually rise to a dispensing temperature and thereafter to maintain said dispensing temperature in said compartment, all automatically without attention on the part of the operator, said last means comprising a source of electrical energy, an electrically operated valve for controlling the circulation through said heat exchange element, a circuit connecting said valve and the blower motor in parallel with each other, a thermostatic switch and a time-controlled switch, said switches being arranged in parallel with each other in said circuit, said thermostatic switch being set to close said circuit when the temperature rises above said dispensing temperature, and said time switch being adapted to shunt out said thermostatic switch for a predetermined period of time sufficient to complete the hardening operation.

15. In a combined hardening and dispensing refrigerator for ice cream and the like, a compartment adapted to receive a container of ice cream, refrigerating means for creating a forced circulation of refrigerated air through said compartment and around said container, said means including an evaporator and a blower having an electric motor for driving the same, and means for controlling the operation of said refrigerating means so as to cause the same to automatically maintain in said compartment, for a period of time sufficient for hardening the ice cream in said container, a low temperature effective for such hardening, then to allow the temperature in said compartment to gradually rise to a dispensing temperature, and thereafter to maintain said dispensing temperature in the compartment, said last means comprising an electrically operated valve for controlling the flow of refrigerant through said evaporator, a source of electrical energy, a circuit for supplying energy from said source to said valve and blower motor, a thermostat adapted to maintain said valve open and said blower operating when necessary to maintain said dispensing temperature, and a time switch adapted to shunt out said thermostat to normally cause constant operation of the refrigerating means for a period of time sufficient to complete the hardening operation.

16. In a combined hardening and dispensing refrigerator for ice cream and the like, a compartment adapted to receive a container of ice cream, refrigerating means for creating a forced circulation of refrigerated air through said compartment and around said container, said means including an evaporator and a blower having an electric motor for driving the same, means for controlling the operation of said refrigerating means so as to cause the same to automatically maintain in said compartment, for a period of time sufficient for hardening the ice cream in said container, a low temperature effective for such hardening, then to allow the temperature in said compartment to gradually rise to a dispensing temperature, and thereafter to maintain said dispensing temperature in the compartment, said last means comprising an electrically operated valve for controlling the flow of refrigerant through said evaporator, a source of electrical energy, a circuit for supplying energy from said source to said valve and blower motor, a thermostat adapted to maintain said valve open and said blower operating when necessary to maintain said dispensing temperature, and a time switch adapted to shunt out said thermostat to normally cause constant operation of the refrigerating means for a period of time sufficient to complete the hardening operation, and pressure-controlled means for terminating the operation of said refrigerating means in the event the pressure in the system should build up beyond a predetermined maximum.

17. In a combined hardening and dispensing cabinet for ice cream and the like, a compartment adapted to hold a container of ice cream, refrigerating means for creating a forced circulation of refrigerated air through said compartment and around said container, said means including an evaporator and a blower having an electric motor for operating the same, and means for controlling the operation of said refrigerating means, said last means comprising an electrically operated valve for controlling the circulation of refrigerant through said evaporator, a source of electrical energy, a circuit for supplying energy from said source to said valve and said blower motor, said valve and blower motor being in parallel with each other, a thermostatic switch, a time switch, said switches being arranged in parallel with each other in the circuit leading to the parallel connections between said valve and motor, said thermostatic switch being adapted to cause operation of the blower and evaporator when necessary to maintain a temperature in the compartment suitable for the dispensing of the ice cream, and said time switch being adapted to shunt out said thermostat and maintain substantially continuous operation of said refrigerating means for a predetermined period of time sufficient to conclude the hardening of ice cream in said container, and a manual switch disposed between said thermostat and the valve whereby operation of the evaporator may be suspended while the blower is operated under the control of the time switch for defrosting purposes.

18. In a combined hardening and dispensing cabinet for ice cream and the like, a compartment adapted to receive a container of ice cream, refrigerating means for creating a forced circulation of refrigerated air through said compartment and around said container, said means including an evaporator, and means for controlling the operation of said evaporator so as to automatically maintain, for a predetermined period of time sufficient for effecting hardening of the ice cream in said container, a low temperature effective for such hardening, to thereafter allow the temperature in said compartment to rise to a dispensing level, and to then maintain the temperature in said compartment at such dispensing level, said last means comprising an electrically operated valve for controlling the circulation of refrigerant through said evaporator, a source of electrical energy, a circuit for conducting electrical energy from said source to said valve, a thermostatic switch and time switch, said switches being arranged in parallel with each other in said circuit, said thermostatic switch being adapted to control the operation of said valve to maintain the temperature in said compartment at the dispensing level, and said time switch being adapted to shunt out said thermostat and to maintain substantially continuous operation of the refrigerating mechanism for the hardening period and to thereafter open so as to allow the thermostatic switch to assume control of said circuit when the temperature has risen to the dispensing level.

19. In a combined hardening and dispensing cabinet for ice cream and the like, a compartment adapted to receive a container of ice cream, refrigerating means for creating desired temperature conditions in said compartment, said means including an evaporator, and means for controlling the operation of said evaporator so as to automatically maintain, for a predetermined period of time sufficient for effecting hardening of the ice cream in said container, a low temperature effective for such hardening, to thereafter allow the temperature in said compartment to rise to a dispensing level, and to then maintain the temperature in said compartment at such dispensing level, said last means comprising an electrically operated valve for controlling the circulation of refrigerant through said evaporator, a source of electrical energy, a circuit for conducting electrical energy from said source to said valve, a thermostatic switch and time switch, said switches being arranged in parallel with each other in said circuit, said thermostatic switch being adapted to control the operation of said valve to maintain the temperature in said compartment at the dispensing level, and said time switch being adapted to shunt out said thermostat and to maintain substantially continuous operation of the refrigerating mechanism for the hardening period and to thereafter open so as to allow the thermostatic switch to assume control of said circuit when the temperature has risen to the dispensing level.

20. In a refrigerator for conditioning ice cream and the like, a cabinet provided with a series of compartments arranged to receive ice cream cans or like containers, insulating walls separating said compartments, a refrigerating compartment extending lengthwise of the cabinet alongside said series of compartments, means for providing in said refrigerating compartment a cooling medium of substantially uniform temperature throughout the length of said compartment, a wall separating said refrigerating compartment from said series of compartments, gates for providing separate and independent communication from said refrigerating compartment to any selected one of said series of compartments, and means for creating a forced circulation of refrigerated air from said refrigerating compartment through any one of said series of compartments which may be open to communication with said refrigerating compartment by the opening of the proper gates.

JAMES T. SMITH.
ALEXANDER L. REITER.